Patented Nov. 18, 1952

2,618,017

UNITED STATES PATENT OFFICE 2,618,017

PRODUCTION OF CAST PRODUCTS FROM UREA FORMALDEHYDE CONDENSATE AND ALBUMINOUS PLASTICIZERS

Waldemar Robert Johannes Happé, London, England, assignor to Happé Products Limited, London, England No Drawing. Application January 4, 1951, Serial No. 204,479. In Great Britain December 20, 1950

3 Claims. (Cl. 18—47.5)

This invention provides for the production of cast solid objects from mixtures containing the so-called "plastic" urea formaldehyde and a plasticiser or softener therefor namely an albuminous body, herein referred to as an albuminous plasticiser.

The term "albuminous plasticiser" as used in this specification means a substance consisting of or containing any albumin, for example "albumen" or egg albumin, blood albumin, gelatin and animal glue. It is used in a sufficient amount to obtain the desired degree of plasticity or lack of brittleness in the solid cast product.

Liquid urea formaldehyde condensation products are mostly sold on the market in the form of a viscous aqueous liquor or resin, consisting of the preformed urea formaldehyde condensation product and water.

These commercial urea formaldehyde resins never contain an excess of free urea but always an excess of formaldehyde. The excess of formaldehyde is not standard as some manufacturers give less and some more, and the greater the excess of formaldehyde the longer the storage life of the resin.

The viscosity of the urea formaldehyde condensation products as sold on the market is not constant, but all are suitable for purposes of the present invention. They may however need to be diluted with water in order that, when mixed with the other components of my molding compositions, the mixtures can be readily poured into a mold.

In converting urea formaldehyde condensation products into resin form, that is to say the aqueous solution form in which they are usually sold, which as explained is an aqueous liquor containing the preformed A-stage urea formaldehyde condensation product in its water-soluble form, into plasticised form, that is to say into solid form containing some plasticising or softening agent, herein termed a plasticiser, the resin rapidly sets into a water-insoluble form.

The object of the present invention is to provide a process for overcoming the above difficulty.

This I have found can be done by incorporating in an aqueous mixture of preformed urea formaldehyde condensation product an albuminous plasticizer, water and an acid setting agent a sufficient but limited amount of free urea to prevent premature coagulation of the albumin by the formaldehyde to facilitate it being cast in a mould.

This trouble does not occur until the urea-formaldehyde has been added. A mixture of glue, water and acid will not tend to set because the acid will rather prevent the glue from setting than cause it to set. When the urea formaldehyde resin is added to the mixture the free formaldehyde of the resin will at once act on the glue and coagulate it instantly; the urea is present to delay that action for a sufficient time to enable the acid to set the urea formaldehyde resin and the free formaldehyde in the resin to coagulate the glue.

If too little urea in comparison with the other ingredients be used, the above mentioned difficulty is not overcome. If too much be used the urea tends to crystallise in the mass after setting which reduces transparency in the product. The quantity of urea used is based on the quantity of albumin and is about equal to between 4% and 55% of the albumin reckoned as solid glue. The limits may vary somewhat with different qualities of glue or different forms of albumin. Further reference to variations in proportions permissible is given below.

The amount of urea is sufficient to permit the components to be mixed while in the liquid state, that is to say the components which include the urea formaldehyde condensation product and to remain liquid until they are introduced in that condition into a mould for casting as distinct from converting them into a dry moulding powder and moulding that powder by the heat and pressure process.

The invention consists in a method for the preparation of urea formaldehyde compositions in solid form which comprises mixing a water-soluble albuminous protein with a small amount of acid setting agent sufficient to effect setting in the desired time and with about from 4 to 55 per cent. of urea by weight, based on the weight of the protein, sufficient water being present to dissolve the protein and to make a liquid mixture, mixing the resulting aqueous mixture with an unset liquid aqueous urea formaldehyde resin, containing urea and formaldehyde combined in resin-forming proportions, in the proportion of 1 part of the aqueous mixture to about 0.5 to 3 parts by weight of the resin, promptly casting the resulting liquid mixture in a mould, removing the resulting casting from the mould and drying and hardening it; the quantity of protein in the aqueous mix being sufficient to plasticize the cast article and the amount of the urea present being sufficient to permit the components of the casting liquid to be mixed while in the liquid state. The invention also consists in a process in accordance with the preceding paragraph in which the cast product is permitted to harden and shrink over a period of days.

In carrying the invention into effect in one form by way of example the basic mixture consists of the following two solutions namely:

(a) An albuminous plasticiser solution composed of:

Animal glue (dry), 25 grammes, that is 41%
Water, 25 cc., that is 41%
Urea, 8 grammes, that is 13%
Phosphoric acid (25% aqueous solution of $H_3PO_4$), 3 cc., that is 5%
Total, 61 parts by weight approximately, that is 100%

The glue is swollen in the water, the other ingredients are added, and the mixture liquefied by gentle heat, for instance 50° C.

(b) Urea formaldehyde solution that is commercial urea formaldehyde resin in aqueous solution.

Each of these two solutions is prepared separately. Any dyestuff or pigment or other inert ingredient may be used; such inert substances may be added either to the first item (a) or to the second item (b), but any additions made to item (b) must be compatible therewith, that is to say they must remain inert and not cause the resin to set. It is not advisable to add free urea to the resin, as the free urea will neutralise the free formaldehyde and thus prevent the formaldehyde from coagulating the glue.

When glycerine is added to the plasticiser in order to give the glue elasticity, the glycerine can be mixed with the glue into a homogeneous mixture. The glycerine could also be mixed with the resin, but it is not advisable to do this, because when the resin and the glue are being brought together, the free formaldehyde in the resin will instantly start coagulating the glue before the glue and glycerine have been mixed into a homogeneous mixture.

The aforesaid two solutions are incorporated by running them together in streams which mix, into a mould in which the mixture is cast, the proportions being usually about 50 cc. of solution (a) to 50 cc. of solution (b).

Variations

The above basic formula may be varied using the same ingredients within the range of proportions set out below, it being understood that only one change is made at a time, namely:

Glue (as above), 5–46%
Water, not less than 25% by weight of the dry glue content, that is making allowances for any water should small quantities be present in the "dry" solid glue.
Urea, 1.85–24%
Acid (treated as phosphoric acid at 1.75 specific gravity), 1–15%

Based on the weight of the protein the urea may vary within the percentages of 4 and 55 thereof.

All liquid aqueous commercial urea-formaldehyde resins are operative which contain the urea and formaldehyde combined in resin-forming proportions.

Mixture (a) may also contain glycerine, which may replace the water to the extent of about 5–10%. Aluminous and siliceous gelatinous substances may also be added to mixture (a) in quantities ranging from 1–15%. These percentages are calculated on the weight of the plasticiser, that is item (a) above.

Urea formaldehyde resin

Commercial aqueous solutions of all kinds may be used. The normal water content of commercial urea formaldehyde resins is from 30–50% by weight; for use according to the present invention the water content of the commercial resin may be modified so long as it is within the limits 30 and 70%.

Regarding the overall ratio of urea to formaldehyde present in the final mixture varying with different manufacturers, commercial urea formaldehyde resins are supplied with proportions of approximately 1 of urea to 2 of formaldehyde, which means that there is usually an excess of formaldehyde. To set the glue for purposes of the present invention the overall ratio of free urea in the final mixture should be about from 4% to 55%.

Egg albumin

| | | | |
|---|---|---|---|
| Dried egg albumin | 50 gr. | or | 45% |
| Water | 50 cc. | or | 45% |
| Urea | 8 gr. | or | 7% |
| Phosphoric acid (as above) | 3 cc. | or | 3% |
| Total | 111 gr.[1] | | 100% |

[1] Approximately.

Blood albumin

The formula for this may be the same as for the egg albumin, but it is preferable to replace the phosphoric acid by a chemically equivalent quantity of citric acid, because phosphoric acid tends to coagulate blood albumin.

Casein

Casein may be used in place of glue as the plasticiser in item (a) above, but in this case it is desirable to add buffering agents such as formates or acetates to control the acidity.

Mixing

In the example given above it has been said that streams of the two ingredients (a) and (b) are mixed by causing them to flow together into a mould. They may however be mixed before entry into the mould by means of a mechanical mixer. I have found a suitable speed for such a mixer to be 80 revolutions per minute and mixing may be effected in five minutes.

Without the free urea in the plasticiser, that is to say in mixture (a), the resin through its formaldehyde content would coagulate the glue almost instantaneously or at least too quickly to make commercial operation practicable. The free urea delays coagulation; enough therefore must always be used to enable the two parts of the mixture, that is to say the plasticiser on the one hand and the urea formaldehyde resin aqueous solution on the other hand to be mixed and remain as a liquid mixture until the time the mixture is led into or introduced into a mould suitably shaped in which it is cast and set to the finished solid form.

Moulds

Any suitable mould can be used for the purpose of casting the product having regard to the shape the product is desired to take. If there be undercut work in the mould, the mould should be of a flexible type, for instance made of gelatin or of plastic materials, having regard to whatever temperature is intended to be used at the time of casting. Casting usually takes place at room temperature and the mixture remains in the mould until it is sufficiently hard or set to be removed therefrom. It is not yet the finished product, but it has to be dried. This may be done with or without heating. In the latter case only gentle heating should be used, say not above 65° C. The time of drying depends on humidity of air, amount of heating, and the other conditions of drying, and the dimensions, principally the thickness, of the casting.

Heat treatment may be used for polymerisation of the resin in the set product.

Heat treatment may be applied by infra-red rays or in any other desired way.

Glue

Where glue has been referred to above this means a commercial form of gelatin. Gelatin may be used in place of glue if desired, like amounts being taken. Glues for use in accordance with the present invention are animal glues as distinguished from vegetable or other glues.

Albumins

Certain albumins have been mentioned above, namely, egg albumin, blood albumin, gelatin and animal glue as well as casein; any other soluble albumin or protein may be used in place thereof, that is to say all animal proteins can be used which are soluble in water or which can be made into colloidal aqueous solution, some examples having been given above, and the invention may be regarded as comprising the step of making an aqueous colloidal solution of an animal protein followed by a mixing step consisting of mixing the aforesaid solution with an aqueous solution of urea formaldehyde resin, making a uniform mixture.

Acids

The function of the acid used according to the present application is to set or solidify the urea formaldehyde resin solution. Phosphoric acid has been given as a typical example, but in place thereof there may be employed singly or in admixture acid or acid reagents, such as sulphuric, lactic, citric, tartaric, oxalic, hydrochloric, salicylic, acetic acids or such acid reagents as aluminium chloride, aluminium sulphate and ammonium chloride. All conventional acid catalysts suitable for the setting of urea formaldehyde resins may be used for the purposes of the present invention.

In the case of casein to prevent coagulation on mixing it with the acid catalyst a buffer is used as stated.

Shrinkage

The invention is distinguished from urea formaldehyde condensation products in solid form which are produced by heat and pressure moulding processes from a dry moulding powder, in that with those processes the product is the same size or very nearly the same size as the mould. In the present case as the products set hard a substantial shrinkage takes place owing to the evaporation of water, which means both that the final product is substantially smaller than the mould and that lines or other fine details are sharpened in comparison with the original.

It may take from a short to quite a long time after the cast objects have been removed from the mould before they reach their final size, depending on the temperature and humidity conditions and the general conditions of drying. Small objects under atmospheric conditions usually reach their final size in 7 days, but larger objects may take up to say 7 weeks. Drying or hardening should not be unduly hurried, for if so cracking may occur or even breakage, due to the fact that there may be a core containing water, which can only escape with considerable difficulty, through the already hardened skin. Drying should be made as uniform as possible over the whole surface of the object to prevent possible warping or cracking.

General

Any aqueous commercial urea formaldehyde resin can be set with an acid but will become brittle and in time crack and split to pieces after drying. The result of this invention is that commercial casting of liquid aqueous urea formaldehyde has for the first time been made possible without defect.

I sometimes term the process a moulding process and sometimes a casting process, but I intend the two terms to be synonymous, that is to say it is a case of casting in a mould. The process does not contemplate the manufacture of a urea formaldehyde condensation product. It starts with such a product already formed but in its "A" or water-soluble stage.

The quantity of acid setting agent required is that which is sufficient to cause setting to take place in the desired time; more acid will cause quicker setting. In the case of glue or gelatine the formaldehyde content in the resin will coagulate the glue or gelatine and the acid in the plasticiser will set the resin. There are two actions in the process; the acid sets the resin and the formaldehyde in the resin coagulates the glue after the delaying action of the urea. Any desired additions may be made to the mixtures referred to above, for filling purposes or for accelerating or for retarding setting.

As to the viscosities of commercial urea formaldehyde resin aqueous solutions, these differ, having regard to the method of manufacture, so that for purposes of the present invention they may need water added to them to make them less viscous or—though this is not normal—they may need to be heated to remove some water to make them of sufficient viscosity to attain the water limits referred to above.

If desired casts of two colours representing cameos may be made by casting in the lower part of the mould a mixture with one colour or uncoloured and then casting thereon, after the first part has partly set or congealed, a mixture with a different colour or uncoloured.

The invention is not limited to any particular colours, but very successful results are obtained by ivory on light blue, cobalt, violet, jade, onyx, coral and lapis-lazuli, commercial colourings being used for these purposes.

Products of the present invention may effectively be made as cameos, earrings, buttons, brooches or the like.

This application is a continuation-in-part of my prior copending application, Ser. No. 7,300, filed February 9, 1948, and now abandoned. In this prior application I described general methods of producing cast products from plastics and plasticizers, while in the present application these methods are described more exactly and the critical conditions required for the production of the most advantageous cast articles are defined more closely.

I claim:

1. A process for the preparation of cast articles from urea-formaldehyde compositions, which comprises forming an aqueous mixture by mixing a water-soluble albuminous protein with approximately an equal weight of water sufficient to dissolve the same, with from about 4 to 55 per cent of urea based on the weight of the protein and with a small amount of an acid setting agent sufficient to produce setting of the final casting mixture, mixing the resulting aqueous mixture with an unset liquid aqueous urea-formaldehyde solution, in the proportions of 1 part aqueous mixture to from about 0.5 to 3 parts by weight of the urea-formaldehyde solution; said urea-formaldehyde solution containing urea and formaldehyde in resin-forming proportions and from about 30 to 70 per cent by weight of water; promptly casting the resulting casting mixture in a mold, removing the resulting casting from the mold, drying and hardening it; the quantity of protein in the aqueous mix being sufficient to plasticize the cast article and the amount of the urea present being sufficient to permit the components of the casting liquid to be mixed while in the liquid state.

2. A process as claimed in claim 1, in which the cast product is permitted to harden and shrink over a period of days.

3. The process of claim 1 wherein the acid setting agent is phosphoric acid and the protein material is animal glue.

WALDEMAR ROBERT JOHANNES HAPPÉ.

REFERENCES CITED

The following references are of record in the file of this patent:

UNITED STATES PATENTS

| Number | Name | Date |
| --- | --- | --- |
| 2,075,276 | Ellis | Mar. 30, 1937 |
| 2,075,804 | Ellis | Apr. 6, 1937 |
| 2,133,335 | Wilson et al. | Oct. 18, 1938 |
| 2,332,801 | Leonardson et al. | Oct. 26, 1943 |
| 2,332,802 | Leonardson et al. | Oct. 26, 1943 |